April 30, 1946.      C. M. VAN ATTA ET AL      2,399,523
CONTROL SYSTEM AND DEVICE THEREFOR FOR SUBMARINE MINES
Filed Feb. 7, 1942      7 Sheets-Sheet 6

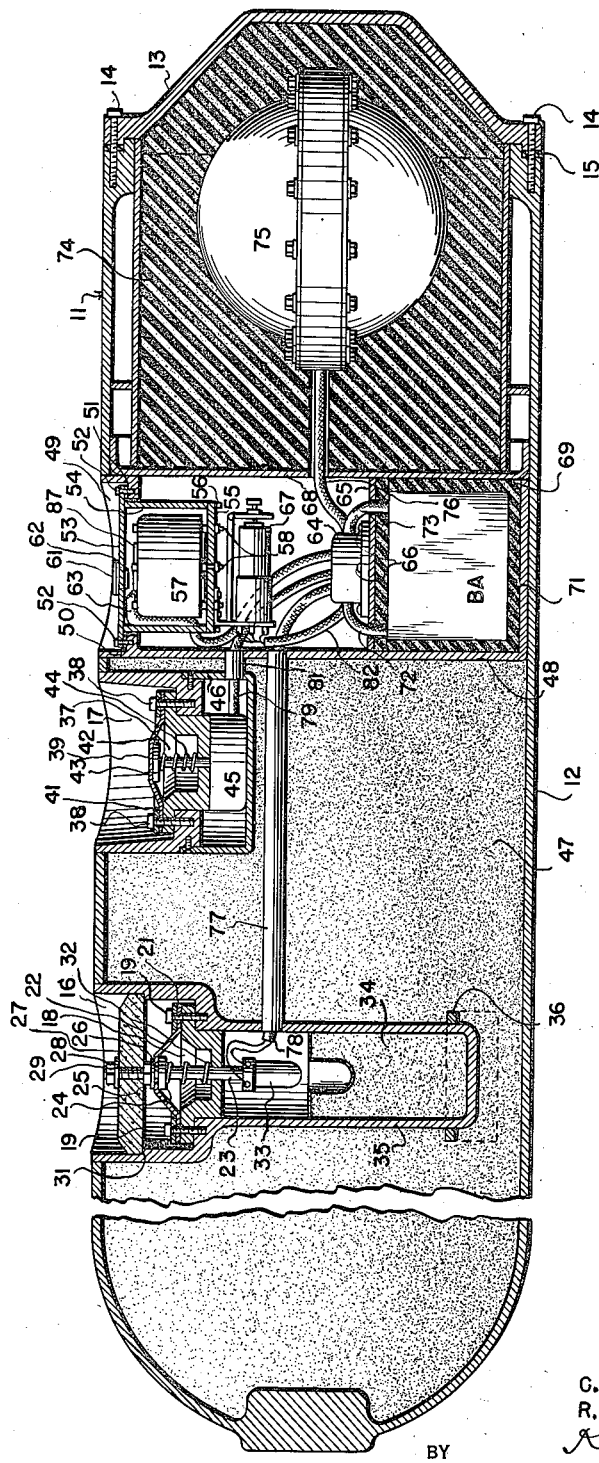

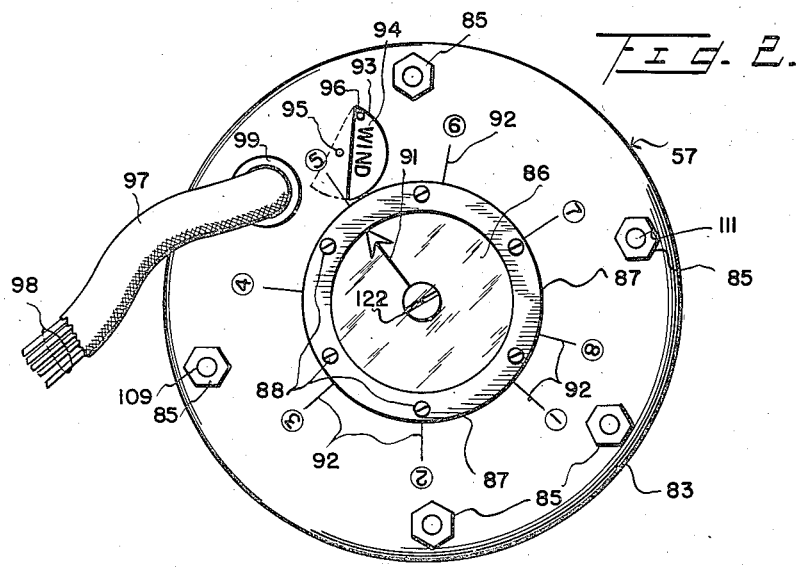
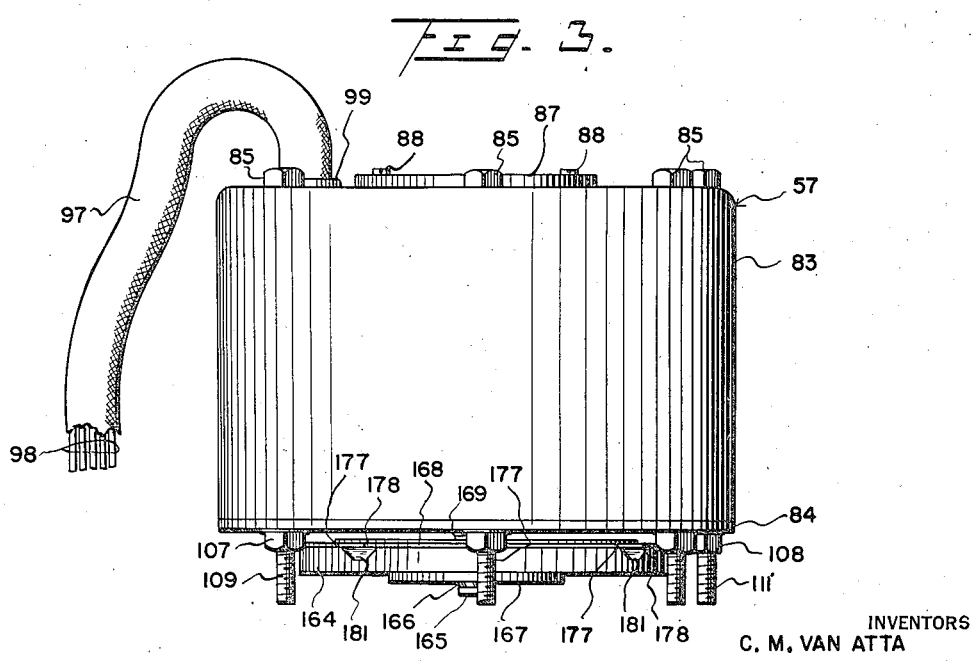

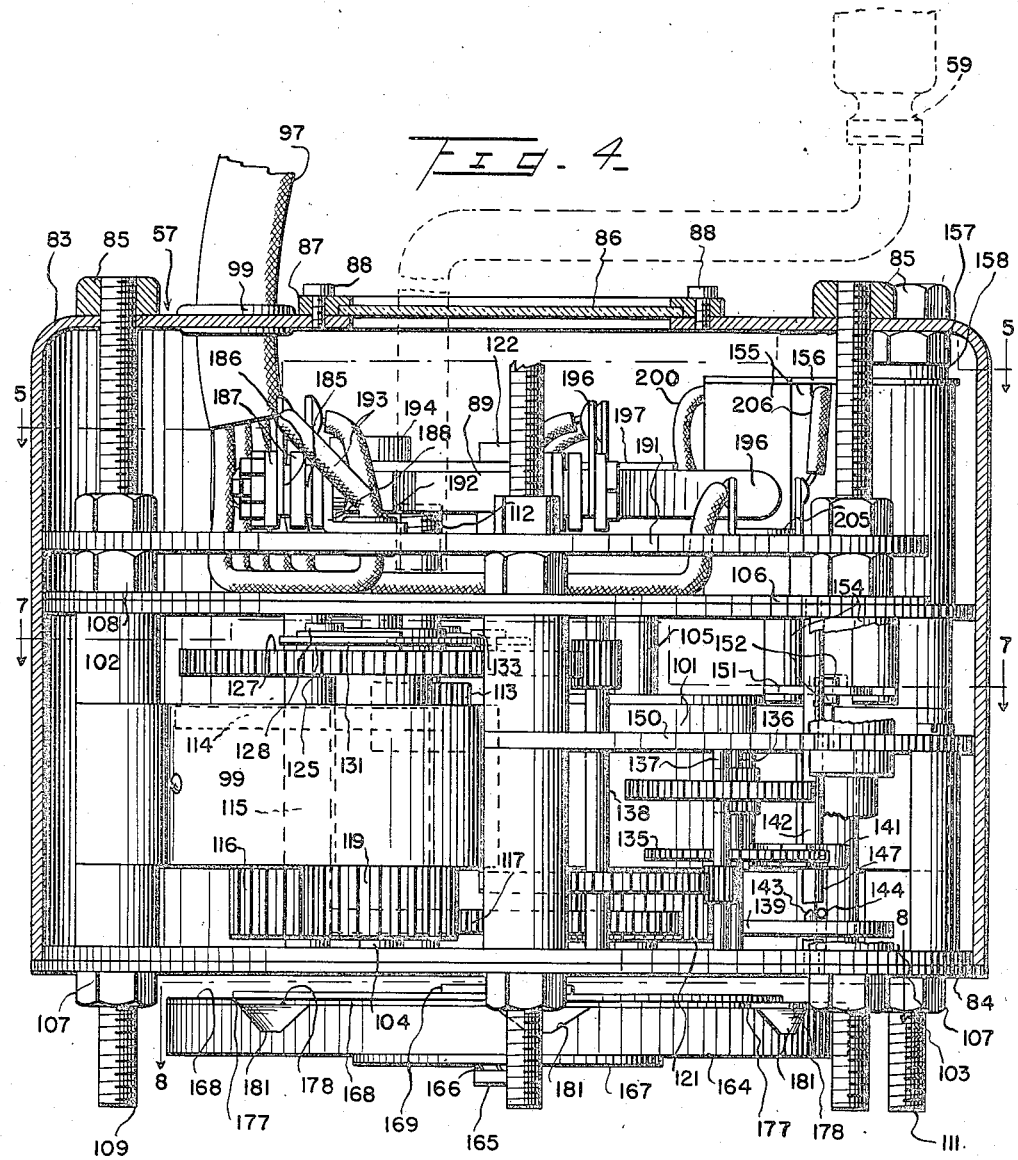

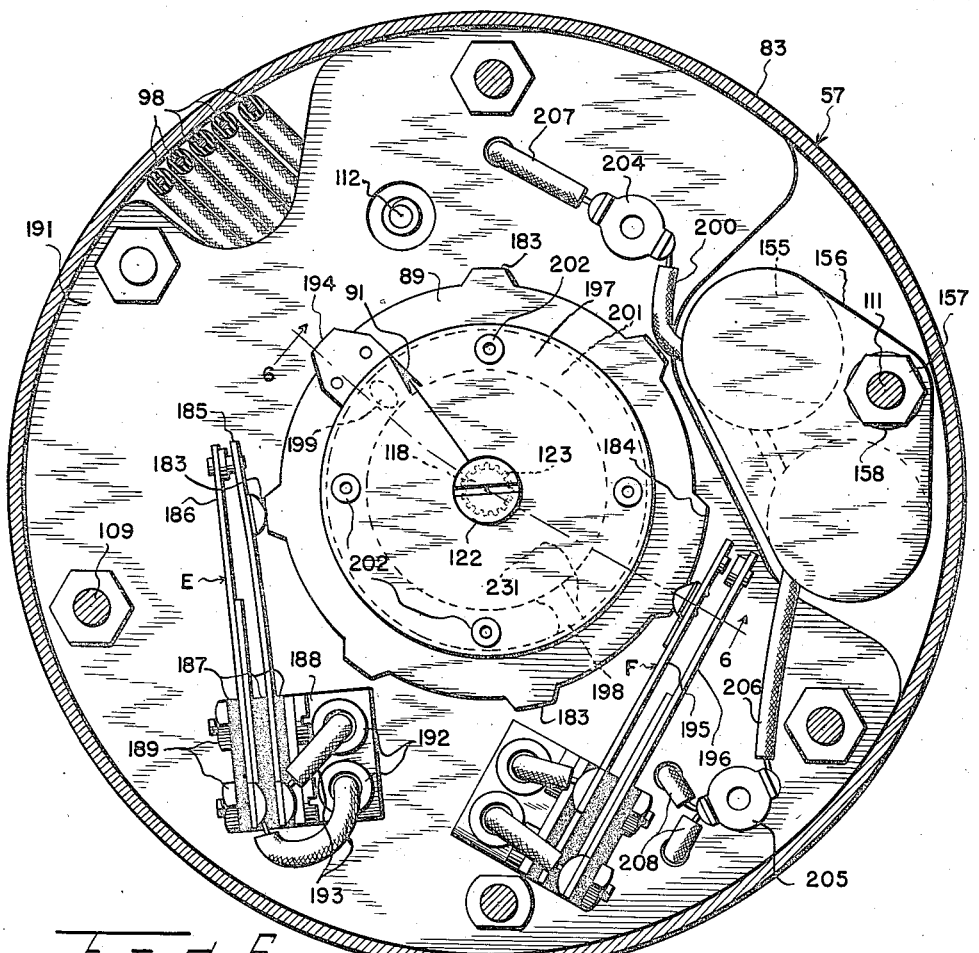
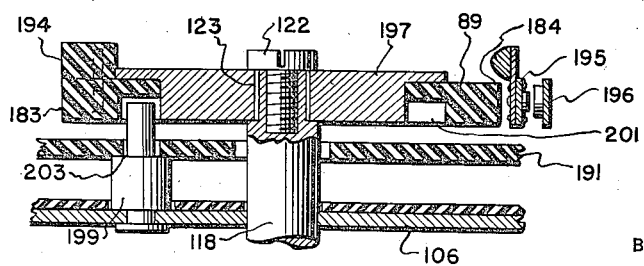

INVENTORS
C. M. VAN ATTA
R. H. WHITEHEAD
BY
ATTORNEY

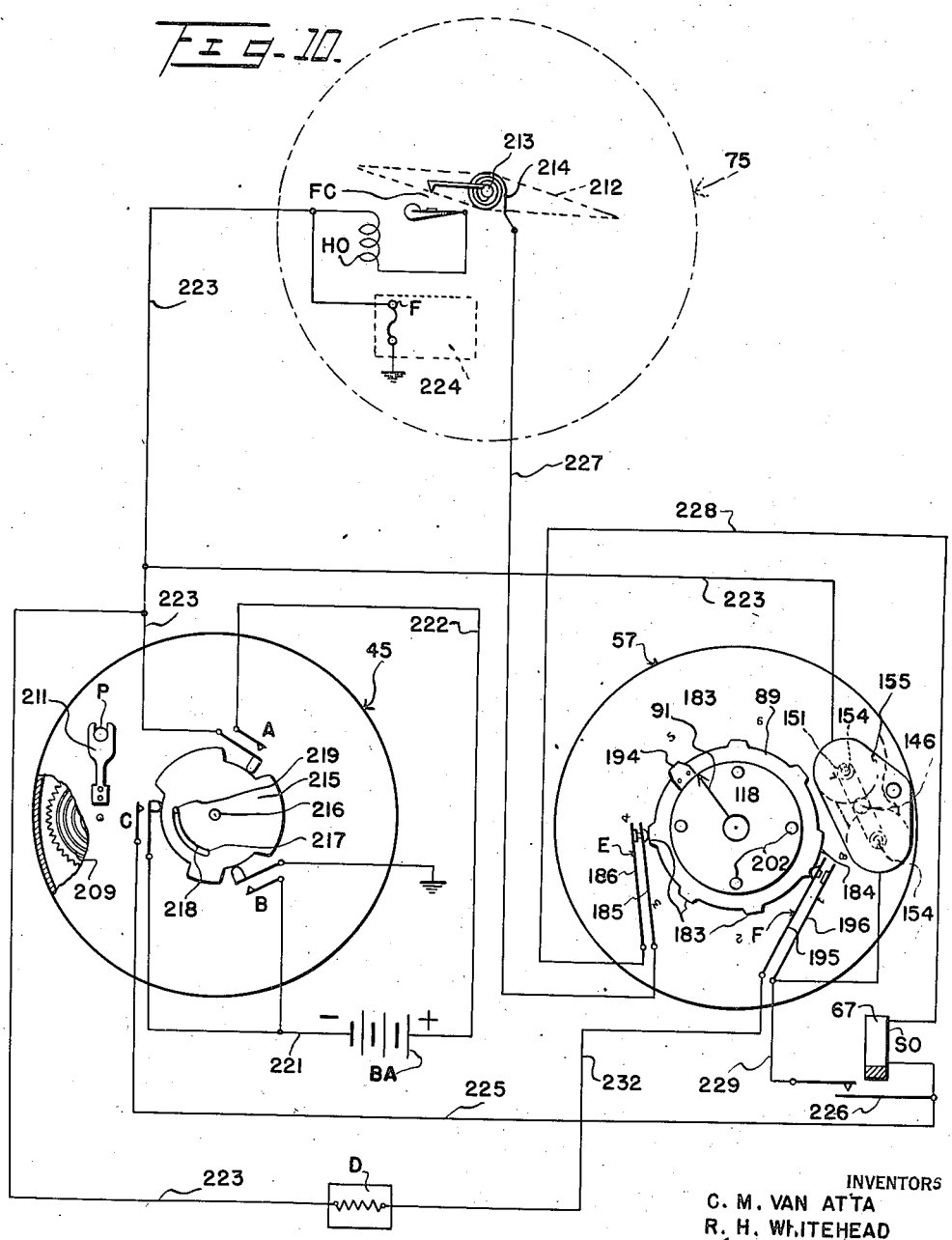

Patented Apr. 30, 1946

2,399,523

UNITED STATES PATENT OFFICE 2,399,523

CONTROL SYSTEM AND DEVICE THEREFOR FOR SUBMARINE MINES

Chester M. Van Atta, Washington, D. C., and Richard H. Whitehead, New Haven, Conn.

Application February 7, 1942, Serial No. 429,963

14 Claims. (Cl. 102—18)

This invention relates to control systems and devices for a submarine mine adapted to be fired automatically upon the approach of a vessel and in which the possibility of premature detonation of the mine by mine sweeping operations is substantially reduced. More specifically, the invention provides a mine firing system and apparatus therefor whereby the mine is in an unarmed condition until a certain number of dedecting signals have been received in predetermined time spaced relation.

In devices of this character heretofore proposed for guarding a mine against detonation in response to an electromagnetic field set up by an impulse of strong current applied to an electrical conductor attached to a vessel moving within the vicinity of the mine and insulated from the sea water within which it is immersed except at the furthermost end thereof, hereinafter referred to as a mine sweeping operation, the control mechanism usually comprises rather delicate electromagnetic operated switching devices for controlling the arming of the mine and for counting the number of signals necessary to place the mine in an armed condition.

In the system of the present invention the mine is caused to be armed by certain cam controlled contacts operated by a spring driven gear mechanism of simple and rugged construction and adapted to be set or adjusted at will to a position corresponding to a predetermined number of signals necessary to bring the mine into an armed condition. Furthermore, the mine is rendered ineffective to receive or utilize additional signals within a predetermined period of time after an initial signal has been received.

One of the objects of the present invention is the provision of new and improved means for causing the mine to fire in response to a predetermined number of vessels passing the same.

Another of the objects is the provision of means settable at will for delaying the arming of a mine until a predetermined number of detecting signals have been received in predetermined time spaced relation.

Another of the objects is to provide new and improved means settable at will for varying the number of detecting signals necessary to arm and detonate the mine.

Another of the objects is the provision of new and improved means for rendering the mine unresponsive to additional signals received within a predetermined interval of time after an initial signal has been received.

Another of the objects is the provision of new and improved mine firing control mechanism which is economical to manufacture, reliable in operation, and possesses all the qualities of ruggedness and reliability in service.

Further other objects, advantages and improvements will be apparent from the following description taken in connection with the accompanying drawings of which:

Fig. 1 is a view in section partly broken away of a submarine mine in accordance with a preferred form of the invention;

Fig. 2 is a plan view of the station selection and firing control mechanism of Fig. 1;

Fig. 3 is a view in elevation of the device of Fig. 2;

Fig. 4 is a greatly enlarged view, partly broken away and with the cover thereof in section, of the station selection and firing control device;

Fig. 5 is a view of the device taken substantially along the line 5—5 of Fig. 4;

Fig. 6 is a view partially in section taken along the line 6—6 of Fig. 5;

Fig. 10 shows in diagrammatic form a complete system suitable for use with the present invention.

Figure 7:
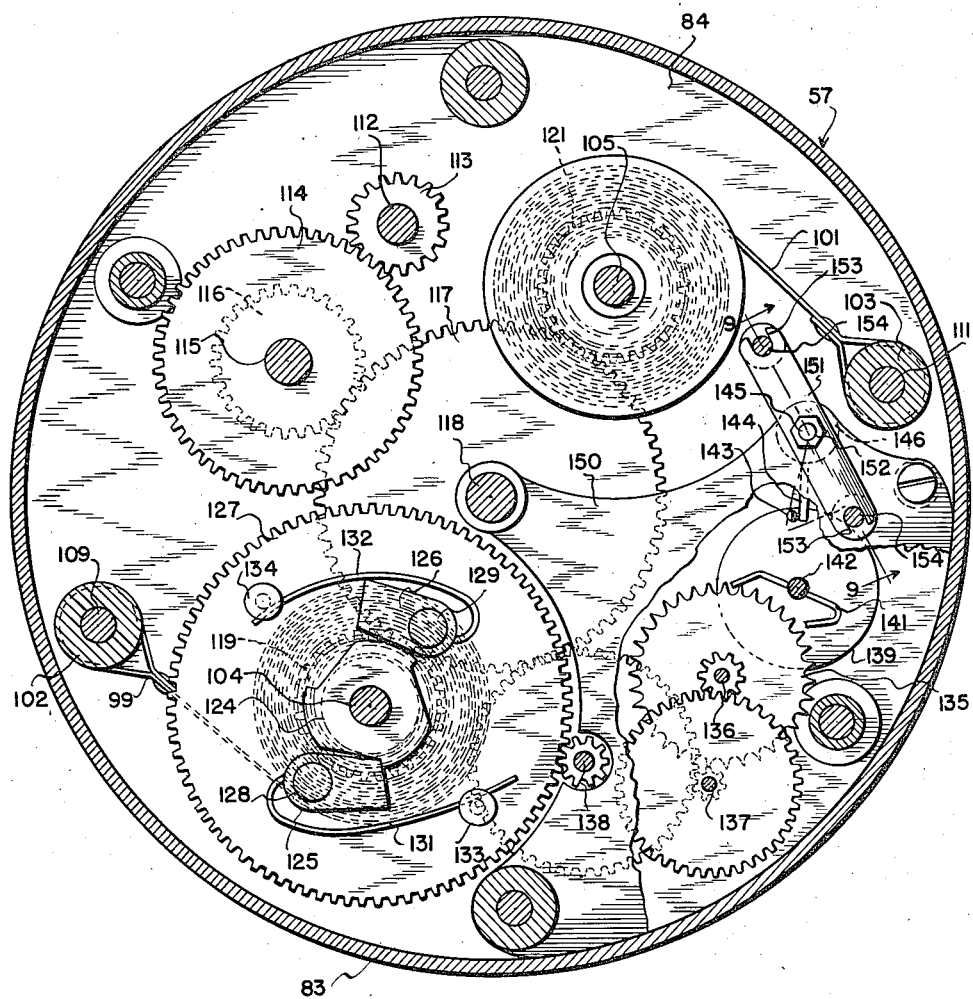
Fig. 7 is a view of the device taken substantially along the line 7—7 of Fig. 4.

Referring now to the drawings and more particularly to Fig. 1 thereof on which is shown a submarine mine adapted to be laid on the bed of a body of water, the mine being indicated generally by the numeral 11 provided with a casing 12 preferably somewhat cylindrical in shape to which is fitted an end cap 13 secured thereto as by the bolts 14, a gasket 15 being provided preferably between the casing and the cap to insure a watertight connection therebetween. The mine is provided with apertures 16 and 17 within which are disposed certain hydrostatic devices adapted to insert a detonating device within an explosive charge and to set a starting clock mechanism in operation respectively. Within the aperture 16 is disposed a member 18 secured to the casing of the mine as by the bolts 19 passing through a retaining ring 21 whereby a flexible diaphragm 22 is secured in sealed relation to the casing. Slidably supported by the member 18 is a plunger or shaft 23 having a shoulder 24 thereon against which the flexible diaphragm 22 is clamped as by the nut 25 and washer 26, the plunger having a soluble washer 27 clamped thereto as by the nut 28 and washer 29. The soluble washer is adapted to engage a shoulder 31 within the aperture 16 whereby the shaft 23 is prevented from movement inward until the soluble washer has dissolved or softened sufficiently to permit the shaft to be extended by the pressure of the water on the flexible diaphragm. The diaphragm is normally urged outward by the pressure of the retractile spring 32 disposed on the plunger 23. Secured to the shaft 23 in any suitable manner is a detonating device 33 adapted to be inserted within a booster charge 34 disposed within a chamber 35 which may be braced, if desired, to the casing 12 as by the member 36.

Within the aperture 17 is disposed a supporting member 37 secured thereto as by the bolts 38, and a flexible diaphragm 39 sealed thereto as by the clamping ring 41. Within the supporting member 37 is a plunger 42 being preferably expanded at the end 43 thereof and maintained in engagement with the flexible diaphragm by the retractile spring 44, the plunger 42 being adapted to set a clock mechanism 45 in operation as the plunger is actuated by the pressure of the water within which the mine is submerged and thereby close certain electrical contacts to energize certain mine firing circuits and devices, as will more clearly appear as the description proceeds. A cover 46 is provided preferably to protect the clock from injury as the casing 12 is filled with an explosive 47 within the chamber formed by the partition 48. There is also provided a recessed portion 49 within the casing 12 having a shoulder 51 thereon to which is secured as by the bolts 52 a mounting plate 53, a suitable gasket 50 being provided between the mounting plate and the shoulder to prevent the seepage of water therebetween. The mounting plate 53 is provided with a member 54 secured thereto in any suitable manner as by welding or brazing the parts together and adapted to support the mounting plate 55 secured thereto as by the bolts 56.

Supported by the mounting plate 55 is a station control and timing mechanism indicated generally by the numeral 57 and secured thereto as by the nuts 58, the station selecting mechanism being adapted to be set at any desired station as by the crank or key 59, Fig. 4, adapted to be inserted into an aperture within the mounting plate 53 when the plug 61 is removed therefrom. The plug 61, it will be understood, is secured to the plate 53 in any suitable manner as by threading the parts together, a suitable gasket 62 being provided therebetween to insure a watertight connection between the plug and the mounting plate. The clock or timing mechanism 57 is provided with a cable 63 extending therefrom and having a plurality of electrical conductors therein whereby the clock device 57 is in electrical connection with a terminal box 64 secured to a partition or plate 65 as by the screws 66.

A slow acting relay 67 is secured preferably to the mounting plate 55 and provided with means such as a copper slug disposed about the core of the relay for delaying the closure of the relay contacts for a predetermined period of time after the operating circuit to the winding of the relay has been closed.

There is also provided within the casing 12 a partition 68 thereby forming a chamber 69 within which is disposed a battery BA, a suitable pad or cushion 71 being arranged between the battery and the inner walls of the chamber 69 to insulate the battery therefrom and prevent injury or damage to the battery as the result of handling, transportation or planting of the mine. The battery BA is provided with a pair of electrical conductors 72 and 73 whereby an electrical connection between the battery and the terminal box 64 is established.

Disposed within one end of the mine casing 12 and yieldably insulated therefrom by a cushion or pad 74 of material suitable for the purpose such, for example, as sponge rubber is a mine firing mechanism indicated generally by the numeral 75 of the type adapted to close an electrical circuit upon the approach of a vessel such, for example, as the mine firing device described in the copending patent application of James B. Glennon and Chester M. Van Atta, Serial No. 395,230, filed May 26, 1941, for improvements in Firing mechanism for a submarine mine in which a pivoted magnetic needle or bar is caused to rotate about a horizontal axis in response to the vertical component of the magnetic field adjacent the mine and thereby move a pair of contacts into electrical engagement with each other. The mine firing device 75 is electrically connected to the terminal box 64 as by the electrical conductors within the cable 76 extending therebetween.

A tubular member or duct 77 is provided between the chamber 35 and the partition 48 within which is disposed the cable 78 comprising a pair of cable conductors connected at one end thereof to the detonating device 33 and at the other end to the terminal or junction box 64. The starting clock 45 is provided with a cable 79 passing preferably within a tubular member 81 extending between the cover 46 and the partition 48 for establishing an electrical connection between the clock and the terminal box. There is also provided a cable 82 extending between the relay 67 and the terminal box 64 whereby the relay is electrically connected to the terminal box, the arrangement of circuits being shown in detail on Fig. 10.

On Figs. 2 and 3 are shown a plan and elevational view respectively of the station selection and firing control mechanism 57 employed with the mine of Fig. 1, the mechanism comprising, among other elements, a cover 83 secured to a base plate 84 as by the nuts 85. The cover is provided with a transparent disk 86 disposed within an aperture at the top of the cover and secured thereto as by the retaining ring 87 and screws 88. Disposed within the cover is a cam member 89, Figs. 4 and 5, having an indicating line or arrow 91 thereon adapted to be brought into substantial alinement with a plurality of scale divisions 92 having indicia associated therewith whereby the clock may be set to a desired station by the key or crank 59, Fig. 4, in accordance with the number of signals required to cause the mine to be fired by the explosive charge.

There is also arranged in the cover 83 an aperture 93 through which the key 59 is adapted to be inserted when it is desired to wind the clock to a predetermined selected station, the aperture having a cover 94 pivoted as at 95 and adapted to close the aperture in the position illustrated on Fig. 2, a pin 96 projecting therefrom being provided for this purpose. An electric cable 97 having a plurality of electrical conductors 98 therein is arranged within a bushing 99 within the cover whereby an external electric connection to the clock may be established.

On Figs. 4, 5 and 7 are shown in considerably enlarged form, several views of the station selection and firing control device of the present invention in elevation and in section taken along the lines 5—5 and 7—7 of Fig. 4 respectively, the detailed views of the mechanism illustrating an arrangement of parts within a structure which has been found to give satisfactory results. The station selection and firing control device comprises preferably two coiled springs 99 and 101 preferably of non-magnetic material such, for example, as phosphor bronze or beryllium copper having one end thereof secured to the posts 102 and 103 at a suitable complementary recessed portion therein and the other end of the springs is secured to the shafts 104 and 105 respectively, the posts 102 and 103 being clamped between the plates 84 and 106, Fig. 4, as by the nuts 107 and 108 threaded on the studs 109 and 111 respectively. The device also comprises a winding shaft 112 having a gear 113 thereon and adapted to receive the crank 59 in the manner shown in dashed outline on Fig. 4, the gear 113 being meshed with the gear 114 on the shaft 115. The shaft 115 also carries a gear 116 secured thereto adapted to mesh with the gear 117 mounted on the shaft 118, the gear 117 being in meshed engagement with the gears 119 and 121 disposed on the shafts 104 and 105 respectively whereby the springs 99 and 101 are geared together and mutually coact to operate the cam member 89 affixed to the shaft 118 as by the screw 122, Fig. 5, threaded within the end of the shaft, a spline 123 being provided preferably between the shaft and the cam to insure positive assembly of the cam upon the shaft in predetermined angular relation thereto.

The shaft 104 has secured thereto a ratchet member 124 adapted to be engaged by the pawls 125 and 126 pivotally mounted upon the gear 127 as at 128 and 129 respectively and urged into engagement with the ratchet member as by the springs 131 and 132 secured thereto, the other ends of the springs being in engagement with the stop members 133 and 134 respectively secured to the gear 127 and rotatable therewith. It will, of course, be understood that the gear 127 is suitably mounted for rotation with respect to the shaft 104, as is well known in the art of clock mechanisms, whereby the shaft 104 and gear 127 may be independently rotated with respect to each other as the springs 99 and 101 are wound or unwound, as the case may be.

The clock mechanism comprises an escapement wheel 135 mounted upon the shaft 136 operatively connected to the gear 127 as by the shafts 137 and 138 and the gears affixed thereto. The escapement wheel 135 is adapted to cause the balance wheel 139 to be oscillated by the escapement member 141 affixed to the shaft 142 which also supports the balance wheel, the balance wheel 139 being normally restrained from movement by the pin 143 secured thereto which normally engages the arm 144 affixed to the plunger 145, Fig. 9. The plunger 145 is slidably supported within a sleeve 146 secured preferably to the plates 84 and 150 and provided with a slotted portion 147 therein within which the arm 144 is adapted to move. The plunger 145 is provided with a stop pin 148 normally held in engagement with the plate 84 by the spring 149 disposed within the sleeve 146 whereby the arm 144 is yieldably maintained within the path of travel of the pin 143 of the wheel 139 and the operation of the clock is thus prevented until the arm 144 is moved away from the pin 143. For this purpose there is provided a bar 151 secured to the upper end of the plunger 145 as by the nuts 152 and having a slotted portion 153 in each end thereof adapted to engage a complementary recessed portion within the plungers 154. The plungers 154 are adapted to be retracted by the electromagnets 155 secured to the plate 106 as by the cover 156 and securely clamped thereto as by the nut 157 and washer 158 arranged on the stud 111 extending through a suitable aperture within the cover. The plate 106 is preferably recessed as at 161, Fig. 9, thereby to maintain the electromagnets 155 in alinement with the bar 151 and the apertures 162 within the plate 106.

Figure 9:
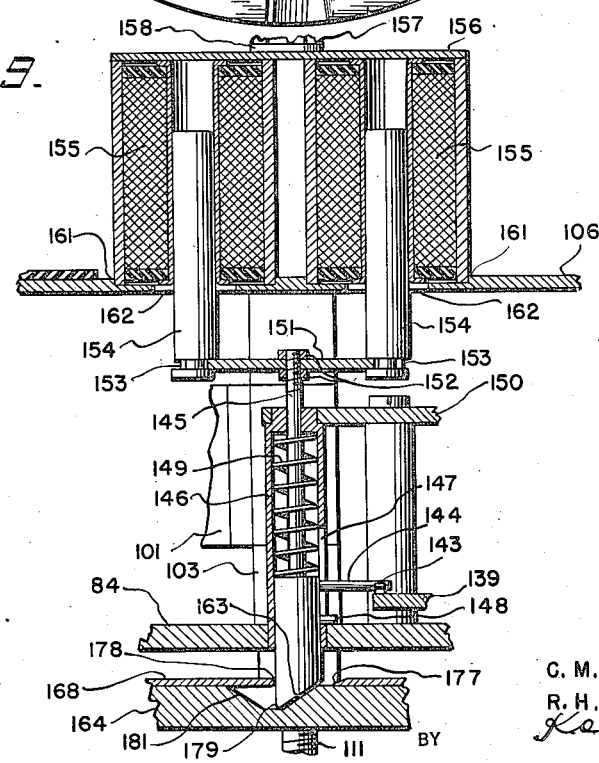
Fig. 9 is a view partly in section taken substantially along the line 9—9 of Fig. 7.

The lower end of the plunger 145 is formed at an angle in the manner illustrated at 163, Fig. 9, thereby providing a cam follower adapted to be urged upward and maintained in the operated position by the cam 164 secured to the shaft 118 as by the screw 165 and washer 166, a suitable spline or key between the cam member and the shaft being provided preferably to insure the maintenance of a predetermined angular relation between the cam member 164 and the cam 89 respectively disposed on opposite ends of the shaft 118. The cam member 164 may be made of any material suitable for the purpose such, for example, as aluminum and provided with a hub 167 secured thereto in any suitable manner having a slotted disk 168 pivotally mounted thereon for rotative movement relative to the cam 164 and retained thereagainst by the collar 169 affixed to the hub as by riveting or staking the parts together.

Figure 8:
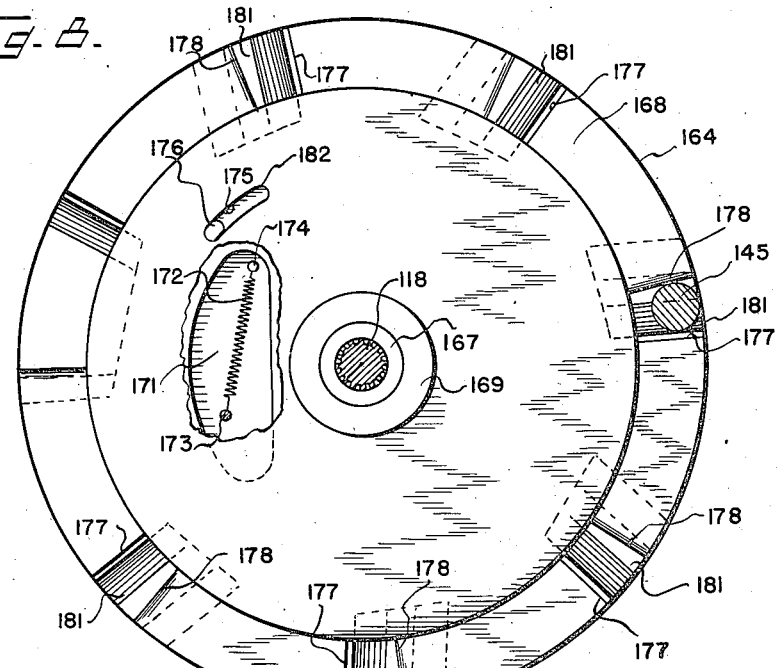
Fig. 8 is a view partly broken away taken along the line 8—8 of Fig. 4.

The cam 164 is provided with a recessed portion 171 therein, Fig. 8, intermediate the cam and the slotted plate 168 within which is arranged a retractile spring 172 having one end thereof in engagement with a pin 173 secured to the slotted disk and the other end connected to a pin 174 secured to the cam whereby the slotted disk 168 is yieldably urged at one end of an arcuately shaped aperture 175 formed therein against a stop pin 176 secured to the cam member 164, the stop pin and arcuate aperture coacting to form an arrangement in which the movement of the slotted disk relative to the cam member is limited to a predetermined angular distance. The slotted disk or baffle plate 168 is provided with a plurality of slots through which the plunger 145 is adapted to move, the leading edge of each slotted portion of the disk 168 being preferably tapered as at 177 to facilitate the passage of the plunger 145 at the tapered end 163 thereof above the disk 168 as the clock is operated by the spring motors thereof in response to the energization of the electromagnets 155.

In operation the circuit to the electromagnet 155 is required to be closed only for a period of time sufficient to release the escapement and allow the clock to operate until the cam 164 has moved sufficiently to maintain the plunger 145 in a raised position by an amount necessary to move the arm 144 clear of the path of travel of the pin 143 on the wheel 139, the clock mechanism continuing to operate until the edge 178 of the disk member 168 of the next succeeding slotted portion of the disk moves beyond the path of travel of the end 179 of the plunger 145 thereby permitting the plunger to be forced by the spring 149 into the corresponding recessed portion of the cam 164 and bring the clock to rest.

As the station selecting clock is wound by the key 59, the cam 164, of course, moves in the opposite direction and the portion 181 of the cam member 164 causes the plunger 145 to be moved upward thereby to permit movement of the cam member 164 in the direction to wind the clock. As the cam 164 moves in a direction to urge the plunger 145 upward at the cam portion 181 thereof, the slotted disk 168 is restrained from movement by the plunger 145 and the disk 168, therefore, is moved relative to the cam member 164 until the pin 176 is brought into engagement with the end 182 of the arcuate portion 175 of the slotted cam, Fig. 8. When this occurs, the plunger 145 is raised sufficiently by the cam portion 181 of the cam 164 to cause the plunger to be forced above the edge 178 of the slotted disk 168 by reason of the somewhat rounded condition of the edge 178 and the end 179 of the plunger whereby the slotted disk 178 is allowed to be moved by the retractile spring 172 to the position shown on Figs. 8 and 9 of the drawings, this cycle of operations being repeated for each additional station to which the clock is set. An arrangement is thus provided in which the plunger 145 is moved quickly to the unoperated position in response to the operation of the retractile spring 149 as the end 179 of the plunger is moved beyond the edge 178 of the disk or baffle plate 168 during the operation of the clock mechanism thereby arresting the clock mechanism and causing the cam 89 thereof to be brought to rest in certain predetermined angular positions thereof corresponding to different station settings at the expiration of predetermined intervals of time.

The cam 89 will now be described with particularity in accordance with a preferred construction thereof which has been found to produce satisfactory results. The cam 89 is provided with a plurality of lobes 183 thereon and a somewhat wider lobe 184 adapted to engage a follower secured to the contact spring 185 and move it into engagement with the contact spring 186 whereby the contacts 185 and 186 are in closed position during the time that the cam 89 is at rest and disengaged from each other as the cam 89 moves from a position of rest. The contact springs 185 and 186 are suitably insulated from each other when the contacts are in open position as by suitable bushings 187 of hard rubber, Bakelite or the like and clamped to a support 188 as by the nuts 189, the support being secured to a plate 191 preferably of insulating material as by the tubular rivets 192 through which pass the insulated conductors 193 whereby an external electrical connection to the contact springs 185 and 186 is established.

There is also secured to the cam member 89 a lobe 194 preferably in alinement with one of the lobes 183 but disposed in a different plane whereby the contact springs 195 and 196 are adapted to be moved into engagement with each other by the lobe 194 when the clock has been operated to the firing position thereof.

The cam member 89 is composed preferably of insulating material suitable for the purpose such, for example, as Bakelite, hard rubber or the like and provided with a hub 197 having a stop member 198 thereon adapted to engage the pin 199 disposed within a recessed portion 201 within the cam member and thereby arrest the cam in the home or initial position thereof and prevent movement of the cam beyond a predetermined angular position from the home position corresponding, in the illustrated embodiment of the invention, to station 8. The cam member 89 is secured to the hub in any suitable manner as by the tubular rivets 202. The stop pin 199 is secured to the plate 106 and provided preferably with a shoulder 203 thereon against which the insulating plate 191 is adapted to rest, thereby additionally supporting the insulating plate 191 near the central portion thereof. There is also secured to the insulating plate 191 a pair of terminal connections 204 and 205 to which the electromagnet 155 is connected as by the conductors 200 and 206 from whence the circuit is continued by way of the conductor 207 and the conductors indicated generally at 208 thereby providing an arrangement in which the external electrical connections to the electromagnet 155 are facilitated.

The operation of the system will best be understood from consideration of Fig. 10 on which is shown in diagrammatic form the starting clock 45, the station selection and firing control clock 45 and the detecting and firing mechanism 75 of Fig. 1 electrically connected together and connected to a firing relay 67. The operation of the firing relay during the time that the station selecting mechanism 57 is in an initial or home position, causes the operation of the detonator D whereby the mine is exploded in response to the passage or approach of a ship within the vicinity of the mine after a predetermined number of detecting signals have been received.

The starting clock 45 may be of any type suitable for the purpose such, for example, as the clock disclosed in the copending application of James B. Glennon and Chester M. Van Atta for improvements in Firing mechanism for a submarine mine, Serial No. 395,230, filed May 26, 1941, in which a plunger P is adapted to be actuated by a hydrostat in response to the pressure of the water within which the mine is launched. The clock mechanism is actuated by a coiled spring 209 preferably of phosphor bronze or beryllium copper as the plunger P is operated by the hydrostat against the pressure of the spring 211.

The firing mechanism 75 comprises a magnetized needle or bar 212 pivoted as at 213 for rotation about a horizontal axis and maintained substantially in the position shown in dashed outline on Fig. 10 by a retractile spring 214 secured thereto. Whenever a large magnetic object such as a steel vessel approaches within the vicinity of the mine, the vertical component of the terrestrial field is altered sufficiently to swing the magnetized element 212 about the axis 213 and close a pair of firing contacts FC, the firing contacts remaining in closed position by reason of the energization of the hold-on coil HO arranged adjacent the magnetized element. Whereas in the arrangement of Fig. 10 only sufficient of the firing mechanism is shown as will enable one skilled in the art to understand the present invention, it will be understood that, if desired, the station selection and control device 57 may be employed with mine firing mechanisms adapted to close a circuit in response to signals received by an induction coil or a plurality of induction coils connected together oppositely and matched with respect to each other whereby an electromotive force is generated by the coils in accordance with the gradient of the magnetic signals received. Furthermore, the magnetized bar 212 of Fig. 10 may, if desired, be automatically set to a predetermined position regardless of the latitude in which the device is disposed by any means suitable for the purpose such, for example, as the latitude setting means disclosed in the copending application of James B. Glennon and Chester M. Van Atta referred to hereinbefore.

Let it be assumed, by way of example, that the submarine mine of Fig. 1 has been launched within a body of water of depth sufficient to cause the operation of the flexible diaphragm 39 thereby setting the clock 45 in operation and that the mine has been launched for a length of time sufficient to cause the soluble washer 27 to be dissolved or softened sufficiently to cause the detonator 33 to be inserted within the booster charge 34 by the pressure of the water against the flexible diaphragm 22. Let it also be assumed that the clock mechanism 57 has been set to station 5, Fig. 10. The movement of the plunger P causes the escapement mechanism of the clock 45 to be released and the cam 215 thereof to be moved about the axis 216 until the cam is arrested by the end 217 of the slotted portion 218 thereof moving into engagement with the stop pin 219. The movement of cam 215 causes cam contacts A and B to be closed at a predetermined time such, for example, as twenty minutes after the clock hydrostat has operated, and the cam contacts C to be closed at the expiration of a subsequent interval of time, such as thirty-five minutes after the cam contacts A and B are closed. The cam contacts A, B and C are prevented from reopening by the cam being brought to rest as the pin 219 is engaged by the end 217 of the slot 218. As contacts A and B are moved to closed position, ground at contact B is applied by way of conductor 221 to one terminal of the battery BA from whence the circuit is continued by way of conductor 222, closed contacts of cam A and conductor 223 to one end of a fuse F within a suitable latitude setting mechanism 224 such, for example, as the latitude setting mechanism of the copending application of James B. Glennon and Chester M. Van Atta hereinbefore referred to, from whence the circuit is continued to ground thereby operating the fuse F and setting the latitude setting mechanism into operation to adjust the spring 214 whereby the magnetized element 212 is given a predetermined setting with the firing contacts FC disengaged from each other. As the clock 45 continues to operate, contact C thereof is closed thereby connecting ground to conductor 225 extending to the winding of relay 67 and to the armature 226 thereof. The arming cycle of the mine has now progressed sufficiently for the electromagnet 155 of the station selecting clock 57 to be operated in response to the closure of the firing contacts FC by the approach of a steel vessel or by an electromagnetic impulse received from a sweep wire, as the case may be.

Assume, by way of example, that mine sweeping operations are proceeding in the vicinity of the mine and that the firing contacts FC are moved into engagement with each other in response to an electromagnetic impulse received from a sweep wire. When this occurs a circuit is closed from positive terminal of battery BA, conductor 222, cam contacts A, conductor 223, winding of the hold-on coil HO, firing contacts FC, conductor 227, cam contact E of the clock mechanism 57, conductor 228, winding of relay 67, conductor 225, cam contacts C of the clock 45, conductor 221 and thence to the negative terminal of battery BA thereby causing relay 67 to operate and the winding of the hold-on coil HO to be energized and set up an electromagnetic field within the vicinity of the magnetized bar 212 in a direction to maintain the firing contacts FC closed until the circuit thereto is interrupted at the cam E contacts. Relay 67, it will be noted, is a slow operating relay by reason of a copper slug disposed on the magnet coil and the armature 226 thereof moves into engagement with its make contact after a predetermined period of time has elapsed since the operating circuit to the relay was closed. When this occurs, a circuit is closed from the negative terminal of battery BA, conductor 221, contacts of cam C, conductor 225, armature 226 and make contact of relay 67, conductor 229, winding of electromagnet 155, conductor 223, cam contacts A, conductor 222 and thence to the positive terminal of battery BA thereby operating the electromagnet 155 and setting the cycling clock mechanism into operation. The operation of the electromagnet 155, it will be recalled, withdraws the plunger 145, Fig. 9, away from the cam member 164 by an amount sufficient to remove the arm 144 from the path of travel of the pin 143 whereby the balance wheel 139 is released for operation by the escapement mechanism.

The cam 89 is rotated in a counterclockwise direction by the escapement mechanism to the next succeeding lower numbered station setting and as the cam moves a sufficient distance to cause the E contacts thereof to be opened, the operating circuit to the relay 67 is interrupted and the relay releases. As armature 226 of relay 67 moves away from the make contact thereof the operating circuit to the electromagnet 155 is interrupted and the electromagnet is deenergized. The plunger 145, however, does not release sufficiently at this time to move the arm 144 thereof into the path of travel of the pin 143 by reason of the cam 164 having been moved through a sufficient distance to hold the plunger operated until the clock mechanism has advanced to the next succeeding lower numbered station. An arrangement is thus provided in which the electromagnet 155 is energized for a relatively short period of time and the drain on the battery is reduced to a minimum. Whereas, in the illustrated embodiment of the invention shown on the drawings, a slow acting relay is employed to effect a delay in the closure of the firing circuit to the detonator D in response to the operation of the firing contacts FC when the station selection clock is in the home or initial position, it will be understood that this is by way of illustration only, as electro-responsive delay devices with a delay mechanism comprising clockwork, escapement wheels, dash pots or other delay means suitable for the purpose may be employed.

As the cam 164 of the clock 57 moves into a station position, the edge 178, Fig. 9 of the slotted disk 168 moves out of the path of travel of the end 179 of the plunger 145 thereby permitting the plunger to be moved by the retractile spring 149 to the position shown on Fig. 9 and bring the clock to rest. As cam contacts E are moved to open position, the energizing circuit for the hold-on coil HO is interrupted thereby causing the hold-on coil to be deenergized and permitting the firing contacts FC to be disengaged as the magnetized bar 212 is restored to the initial position thereof by the retractile spring 214 in response to the discontinuance of the electromagnetic impulse received.

As cam 89 moves into the station 4 position the contacts E thereof are closed thereby preparing a circuit to the firing control mechanism 75 whereby the electromagnet 155 is again brought under the control of the firing contacts FC. The time required for the cam 89 to be moved by the spring mechanism from a particular station setting to a setting corresponding to the next succeeding lower numbered station is determined by the ratio of gears employed in the gear train and the rate of the oscillations of the balance wheel 139 thereof, a time interval of substantially three minutes, for example, having been found to produce satisfactory results.

Let it be assumed that the firing contacts FC are moved to closed position by another impulse from a sweep wire thereby closing a circuit from the positive terminal of battery BA, conductor 222, cam contacts A, conductor 223, hold-on coil HO, firing contacts FC, conductor 227, cam E contacts, conductor 228, winding of relay 67, conductor 225, cam C contacts, conductor 221 and thence with the negative terminal of battery BA thereby operating relay 67 and energizing the hold-on coil in a direction to maintain the firing contacts closed. The energization of the coil winding of relay 67 causes the armature 226 thereof to be moved, after a suitable time delay, into engagement with the make contact thereof thereby operating the electromagnet 155 and setting the clock 57 in operation. As the cam 89 moves away from the station 4 position, contacts E thereof are disengaged thereby interrupting the circuit to the hold-on coil and the relay 67. The hold-on coil is deenergized thereby permitting the firing contacts to be moved to open position by the latitude setting spring 214 and the release of the relay 67 at the armature 226 thereof causes the electromagnet 155 of the station selection clock 57 to be deenergized, but the plungers 154 thereof and the member 145 are prevented from releasing at this time sufficiently to arrest the escapement mechanism of the clock by reason of the cam 164 which, it will be recalled, has moved sufficiently to maintain the plunger 145 in the operated position when the cam 89 has moved sufficiently to disengage contacts E.

As the clock moves into the station 3 position the edge 178 of the baffle plate 168 moves beyond the path of travel of the end 179 of the plunger 145 and the plunger, therefore, is forced into the released position by the retractile spring 149 such that the stop pin 148 thereof engages the plate 84 and the arm 144 secured thereto is engaged by the pin 143 of the balance wheel 139. The clock is thus brought to rest in the position corresponding to station 3. As the cam 89 moves into the station 3 position the cam contacts E are moved to closed position and the clock is again brought under the control of the firing contacts FC.

In the event that a steel vessel approaches within the vicinity of the mine, the firing contacts FC are moved to closed position thereby causing the relay 67 to operate and the hold-on coil to be energized. The operation of relay 67 caused the start magnet 155 of the clock 57 to operate thereby setting the clock in operation. As the cam 89 moves out of the station 3 position, cam contacts E are disengaged thereby causing the hold-on coil to be deenergized and the relay 67 to release. The release of relay 67 interrupts the operating circuit to the start magnet 155, the clock mechanism, however, continuing to operate by reason of the movement of cam 164 from the station 3 position thereof. When the vessel has moved a sufficient distance beyond the mine the magnetized bar 212 is moved by the spring 214 sufficiently to cause the firing contacts FC to open. As the clock moves into the station 2 position the contacts E thereof are closed. The clock is brought to rest in the station 2 position as the end 179 of the plunger 145 passes over the edge 178 of the baffle plate 168.

As the firing contacts are moved to the closed position by a change in the magnetic field adjacent thereto caused by either a vessel or by a sweep wire, as the case may be, the operation of relay 67 causes the start magnet 155 to operate thereby releasing the escapement mechanism and causing the cam 89 to be advanced to the station 1 position, relay 67 and the start magnet 155 releasing in response to the disengagement of cam E contacts as the cam 89 moves away from the station 2 position. As the clock moves into the station 1 position the contacts E are again closed but the relay 67 and start magnet 155 do not operate at this time for the reason that the firing contacts FC have moved to open position during the movement of the cam 89 from the station 2 position to the station 1 position.

As the cam 89 moves into the initial or station 1 position the lobe 194 thereof causes the contacts F to close thereby arming the mine.

As a vessel approaches within the vicinity of the armed mine the disturbance in the magnetic field adjacent thereto causes the magnetized element 212 to be moved to firing position thereby closing the firing contacts FC. When this occurs a circuit is closed from the positive terminal of battery BA, conductor 222, cam contacts A, conductor 223, winding of hold-on coil HO, firing contacts FC, conductor 227, cam contact E of the station selection clock 57, conductor 228, winding of relay 67, conductor 225, cam contact C, conductor 221 and thence to the negative terminal of battery BA thereby energizing the hold-on coil in a direction to maintain the firing contacts closed, and causing the relay 67 to operate.

Relay 67, it will be recalled, is a slow-to-operate relay and the armature 226 thereof does not move into engagement with its make contact until a predetermined period of time has elapsed sufficient to permit the vessel to attain a position directly above the mine before the mine is exploded whereby the explosion of the mine will occur beneath a vulnerable portion of the vessel and the maximum destructive effect thereof is obtained. As armature 226 of relay 67 moves into engagement with its make contact the start magnet 155 of the station clock 57 is energized but the cam 89 is prevented from movement beyond the station 1 or home position by reason of the engagement of the portion 231 of the member 198 disposed within the recessed portion 201 thereof by the stop pin 199. As armature 226 of relay 67 moves into engagement with the make contact thereof a circuit is also closed from the negative terminal of battery BA, conductor 221, cam contact C, conductor 225, armature 226 and make contact of relay 67, conductor 229, cam contacts F of the clock 57, conductor 232, detonator D, conductor 223, cam contact A, conductor 222, and thence to the positive terminal of battery BA thereby causing the detonator D to operate and explode the mine.

Whereas in the foregoing example the clock is assumed to be set to station 5, it will be understood that the clock may be set to any desired station and the number of signals received by the clock necessary to arm the mine will, of course, be controlled by the station at which the clock is initially set. An arrangement is thus provided in which the mines comprising a mine field may, in accordance with the present invention, be arranged in such a manner that certain of the mines will be armed in response to one signal received from an outside source such, for example, as a sweep wire, others of the mines will be armed by two signals and still others of the mines by different numbers of signals, and the enemy, therefore, will be unable to sweep all of the mines of a particular mine field by a single mine sweeping operation. In fact the enemy is likely to be deceived by the explosion of a few mines in response to his mine sweeping operations thereby leaving a considerable portion of the mine field intact with some of the mines thereof in an armed condition and others of the mines waiting to be armed by subsequent mine sweeping operations or the passage of vessels, as the case may be.

Briefly stated in summary, the present invention contemplates the provision of a mine firing control mechanism in which a predetermined number of changes in a magnetic field are required at predetermined successive intervals of time to arm the mine and in which the closure of the mine firing circuit in response to the approach of a vessel is delayed sufficiently to cause the mine to explode underneath a vulnerable portion of the vessel. Furthermore, it will be understood that any suitable device for detecting the approach of a vessel may be employed in which an outgoing circuit is closed by any suitable means such, for example, as the closure of a pair of electrical contacts or the operation of a thermionic or other suitable amplifying device arranged between the detecting mechanism and the station selection and firing control mechanism 57.

While the invention has been described with particularity as to one preferred embodiment of a combination of mechanisms and of each of the various elements of the combination, it is to be understood that this has been done for the purpose of disclosure and that various changes and substitutions may be readily apparent to those skilled in the art, after understanding the invention herein disclosed, and the terms employed in the appended claims are, therefore, to be considered as words of description rather than of limitation.

The invention herein described and claimed may be manufactured and used by or for the Government of the United States of America for governmental purposes without the payment of any royalties thereon or therefor.

What is claimed as new and desired to be secured by Letters Patent of the United States is:

1. In a submarine mine of the character disclosed disposed within a body of water adjacent the path of travel of a vessel, a source of power, an electric circuit, means responsive to a disturbance in the terrestrial magnetic field adjacent the mine for closing the electric circuit, a detonating device, a station selecting device having a home position and a plurality of moved positions corresponding to different station settings respectively, means for setting said station selection device to any of said station settings, means including a spring motor for actuating said station selecting device, means for releasably arresting the station selecting device in any of said moved positions thereof, means including an electro-responsive device controlled by said circuit closing means for causing said station selection device to be advanced to the next succeeding station, means effective when the station selecting mechanism is in said home position for closing a circuit in part to said detonating device, and means controlled by said last named circuit closing means for causing the detonating device to be operated by said source of power in response to the closure of said first named circuit closing means.

2. In a submarine mine of the character disclosed disposed within a body of water adjacent the path of travel of a vessel, a source of power, an electric circuit, means responsive to a disturbance in the terrestrial magnetic field adjacent the mine for closing the electric circuit, a detonating device, a clock mechanism having a home position and a plurality of moved positions corresponding to different station settings respectively, a first pair of contacts adapted to be closed as the clock is moved into any of said moved positions, means for setting said clock mechanism to any of said moved positions, means including a spring motor for actuating said clock mechanism, means for releasably arresting the clock mechanism in any of the moved positions thereof, means including an electro-responsive device controlled by said first pair of contacts and said circuit closing means for causing the clock mechanism to be advanced to the next succeeding position, a second pair of contacts adapted to be closed when the clock mechanism is actuated to said home position, and a firing circuit controlled by said second pair of contacts for causing the detonating device to be operated by said source of power in response to the closure of said electric circuit by said circuit closing means.

3. In a system of the character disclosed adapted to control the firing of a submarine mine arranged within a body of water, a circuit, a source of electrical power, means responsive to a change in the magnetic field adjacent the mine for energizing the circuit from said source of electrical power, a clock mechanism adapted to be operated in unit cycles, electro-responsive means controlled by said circuit for causing said clock mechanism to be set in operation to perform a unit cycle of operations, detonating means adapted to be operated by said source of electrical power, and means for causing the detonating means to be operated in response to the energization of said circuit when said clock mechanism has made a predetermined number of unit cycles of operation.

4. In a system of the character disclosed for controlling the firing of a submarine mine, a circuit, means responsive to a change in the magnetic field adjacent the mine for closing the circuit, a clock mechanism adapted to operate in unit cycles, electro-responsive means controlled by said circuit adapted to set the clock mechanism in operation successively to perform one of said unit cycles of operation, each time said circuit is closed, means for setting said clock mechanism to an initial setting correspond to a predetermined number of unit cycles of operations to be performed, a source of electrical power, detonating means and means effective when the clock mechanism has performed said predetermined number of unit cycles of operation for causing said detonating means to be operated by said source of power in response to the closure of said circuit by said circuit closing means.

5. In a system of the character disclosed for selectively controlling the firing of a submarine mine arranged within a body of water, a circuit, a source of electrical power, means responsive to a change in the magnetic field adjacent the mine for closing said circuit from said source of electrical power, a clock device operable in unit cycles and having a pair of normally closed contacts in said circuit adapted to be disengaged during each of the cycles of operation thereof, a slow acting relay device in said circuit and adapted to be operated when the circuit is closed by said circuit closing means and the normally closed contacts are closed, means for releasing said clock device successively to perform said unit cycles of operation, means for arresting the clock device as each of said cycles of operation is completed, a pair of normally open contacts adapted to be closed when the clock device has made a predetermined number of unit cycles of operation, and a detonating device operatively connected to said normally open contacts and adapted to fire the mine in response to the operation of said slow acting relay device while the normally open contacts are closed.

6. In a device for controlling the firing of a submarine mine in accordance with a predetermined number of signal conditions received corresponding respectively to changes in the magnetic field adjacent thereto, the combination of means including a circuit closing device for detecting said changes in the magnetic field, a rotatable member having a firing position and a plurality of moved positions corresponding respectively to different numbers of signals required to arm the mine, means for initially setting said rotatable member to any of said moved positions, means controlled by said circuit closing device for actuating said rotatable member from each moved position to an adjacent position in successive order as changes in said magnetic field are detected by said detecting means, detonating means, and means effective when the device has been armed for causing the detonating means to fire the mine in response to the operation of said circuit closing device as a change in said magnetic field is detected by said detecting means.

7. In a device for controlling the firing of a submarine mine, the combination of a source of electrical power, detecting means comprising a circuit closing device adapted to be moved to circuit closing position in response to a change in the magnetic field adjacent thereto, means controlled by the pressure of the water within which the mine is submerged for connecting said circuit closing device to said source of electrical power, a spring operated clock mechanism having a rotatable element settable to a firing position and to a plurality of different positions corresponding respectively to the number of changes in said magnetic field required to arm the mine, means for setting said rotatable element to a predetermined one of said different positions, means including a stop member for releasably arresting the clock mechanism in each of said positions, a pair of contacts in electrical connection with said circuit closing device adapted to be closed as said rotatable element moves into each of said different positions, a relay device adapted to be operated selectively by said circuit closing device in accordance with the operated condition of said pair of contacts, electro-responsive means controlled by said relay device adapted to operate said stop member and thereby release the rotatable element for operation to the next succeeding position thereof, means including a cam for maintaining said stop member operated until the rotatable element thereof has been advanced to said next succeeding position, an explosive charge arranged within the mine, a firing circuit having a detonating device therein adapted to fire said explosive charge, and means effective when the rotatable element has moved into said firing position for rendering said firing circuit effective to be operatively connected to said source of power by said relay device and thereby explode the mine in response to the closure of said circuit closing device.

8. In a system for controlling the firing of a submarine mine selectively in accordance with the number of signals received corresponding respectively to a predetermined number of changes in the earth's magnetic field adjacent thereto, a source of power, means responsive to said changes in the magnetic field adapted to close a circuit from said source of power, a clock device having a rotatable shaft settable to an initial position and to a plurality of moved station positions, a spring motor adapted to operate said shaft from any of said moved positions to said initial position, a pair of normally closed contacts, means including a cam secured to said shaft and rotatable therewith for causing said contacts to be engaged when said cam is set to any of said positions and adapted to cause said contacts to be disengaged as the cam moves away from each station position, means for releasably arresting said shaft in each station position and in the initial position thereof, an electro-responsive device controlled by said contacts adapted to be operated by said circuit closing means and thereby release said shaft for rotation to the next succeeding station position, a second cam device secured to said shaft and rotatable therewith adapted to prevent the release of said electro-responsive device as said contacts are moved to open position until the shaft moves into the next succeeding station position, a second pair of contacts adapted to be closed by said rotatable cam as the shaft moves into said initial position, an explosive charge, detonating means and means for causing said explosive charge to be fired by the detonating means in response to a change in the magnetic field when said second pair of contacts have been closed.

9. In a system for controlling the firing of a submarine mine selectively in accordance with the number of signals received corresponding respectively to a predetermined number of changes in the earth's magnetic field adjacent thereto, a source of power, means including a pair of firing contacts responsive to said changes in the magnetic field adapted to close a circuit from said source of power, a station selecting device having a rotatable shaft settable to an initial position and to a plurality of station positions, a cam element having a plurality of lobes thereon secured to said shaft and rotatable therewith, means for setting said shaft and cam element to a desired station position, a gear train having an escapement mechanism operatively connected thereto for controlling the movement of said rotatable shaft, means for releasably arresting said escapement mechanism as the cam element moves into each station position, a pair of contacts adapted to be closed successively by said lobes as the cam element moves into each of said station positions, an electroresponsive device controlled by said pair of contacts having means for releasing said escapement mechanism in response to the closing of said firing contacts, means for maintaining said escapement mechanism released until said cam element has moved into the next succeeding station position, and means controlled by a certain one of said lobes on said cam element for arming the mine as the cam element moves into said initial position.

10. In a device for arming a submarine mine arranged within a body of water in response to a predetermined number of changes in the magnetic field adjacent thereto, a combination of a spring driven timing mechanism settable at will to different station settings corresponding respectively to said predetermined number of changes in said magnetic field, a pair of firing contacts adapted to be closed in response to each of said changes in said magnetic field, electro-responsive means controlled by said firing contacts for causing said timing mechanism to be advanced from each station setting to the next succeeding station setting, means controlled by said timing mechanism for rendering said firing contacts ineffective during the movement of said mechanism from each station setting to the next succeeding station setting, said last named means being adapted to restore the effectiveness of said firing contacts to control said electro-responsive means as the timing mechanism moves into each of said succeeding station positions, an explosive charge disposed within the mine, means for detonating said explosive charge, and means effective when said mechanism has moved through a predetermined number of station positions for arming the mine whereby said detonating means is adapted to fire said explosive charge in response to the next succeeding operation of said firing contacts.

11. In a system of the character disclosed for controlling the firing of a submarine mine selectively in accordance with a predetermined number of changes in the magnetic field adjacent thereto, a pair of firing contacts adapted to be closed in response to a change in said magnetic field, a station selecting device having an initial position and a plurality of station settings, means including a spring for actuating the station selecting device, means for setting said selecting device to a predetermined station setting, a pair of electrical contacts adapted to be closed as the station selecting device moves into each of said station settings, a slow acting relay operatively connected to said electrical contacts and adapted to be operated by said firing contacts when the electrical contacts are closed, electro-responsive means controlled by said slow acting relay adapted to cause said selecting device to be moved from each station setting by said spring actuating means, means including a control cam element adapted to transfer the control of said station selection device from said electro-responsive device to said control cam element thereby to maintain said station selecting device continuously in operation until the device has been moved from a station setting to said next succeeding station setting, means for maintaining said firing contacts in closed position for a predetermined period of time after the firing contacts are closed thereby to cause said selecting device to move from each station setting sufficiently to cause said control cam element thereof to be effective, and means effective when the control of said station selecting device has been transferred from said electro-responsive device to said cam element for releasing the slow acting relay and said electro-responsive device.

12. In a system for controlling the firing of a submarine mine, a pair of firing contacts adapted to be closed in response to a change in the magnetic field adjacent thereto, a source of electrical power, means controlled by the pressure of the water within which the mine is immersed for connecting said firing contacts to said source of power within a predetermined period of time after the mine has been launched, a spring driven timing device settable at will to different settings, means for causing said timing device to be advanced to the next succeeding setting within a predetermined interval of time after said firing contacts are closed, means for rendering said firing contacts ineffective during the movement of said timing device from each of said settings to the next succeeding setting, detonating means, a pair of normally open contacts in electrical connection with said detonating means, means for closing said normally open contacts when the timing device has moved into a predetermined one of said different settings, and means for causing said detonating device to fire the mine in response to the operation of said firing contacts when the timing device has moved into said predetermined one of said settings.

13. In a device adapted to control the firing of a submarine mine in accordance with a predetermined number of changes in the magnetic field adjacent thereto occurring in predetermined time delayed relation, spring driven means adapted to actuate said device, said spring driven means being adapted to be set to an initial setting and to a plurality of different settings, means including a manipulative device for setting said spring driven means selectively to said different settings thereof corresponding respectively to different degrees of energy stored therein, means for detecting a change in said magnetic field and having a pair of firing contacts adapted to be closed as a change in the magnetic field is detected, means controlled by said firing contacts for causing the spring driven means to be moved regressively to said different settings in succession, detonating means, and means controlled by the settings of said spring driven means for operatively connecting said detonating means to the firing contacts when said spring driven means has moved regressively through said different settings to said initial setting.

14. In a system for controlling the firing of a submarine mine selectively in accordance with a predetermined number of changes in the magnetic field adjacent thereto, an electric circuit, means responsive to a change in said magnetic field for closing said electric circuit, a control device comprising a rotatable cam element having a home position and a plurality of moved positions corresponding respectively to different numbers of changes in the magnetic field required to fire the mine, a first pair of contacts adapted to be closed as the rotatable cam element is moved into any of said moved positions, manipulative means for initially setting said cam element to any of said moved positions, means including a spring driven motor for actuating said cam element, means for releasably arresting said rotatable cam element in any of the moved positions thereof, means including an electro-responsive device adapted to be operated by said circuit closing means when said first pair of contacts are closed for causing the cam element to be released and advanced to the next succeeding position, detonating means, a source of power, means effective when said rotatable cam element is moved to said home position for causing said detonating means to be operated by said source of power in response to the closure of said electric circuit by said circuit closing means, and means for preventing the movement of said rotatable cam element beyond said home position and for preventing additional movement of the cam beyond a predetermined moved position.

CHESTER M. VAN ATTA.
RICHARD H. WHITEHEAD.